United States Patent

Matsuo

[11] Patent Number: 4,566,764
[45] Date of Patent: Jan. 28, 1986

[54] WIDE-ANGLE LENS

[75] Inventor: Hirohumi Matsuo, Tokyo, Japan

[73] Assignee: Asahi Kogaku Kogyo Kabushiki Kaisha, Tokyo, Japan

[21] Appl. No.: 597,458

[22] Filed: Apr. 5, 1984

[30] Foreign Application Priority Data

Apr. 6, 1983 [JP] Japan ................................ 58-60617

[51] Int. Cl.$^4$ .............................................. G02B 9/64
[52] U.S. Cl. .................................................. 350/459
[58] Field of Search ............................. 350/458, 459

[56] References Cited

U.S. PATENT DOCUMENTS

| 3,832,037 | 8/1974 | Nakagawa | 350/459 |
| 3,870,400 | 3/1975 | Yamashita et al. | 350/459 X |
| 4,145,116 | 3/1979 | Ikeda | 350/458 |
| 4,188,092 | 2/1980 | Momiyama | 350/458 |

FOREIGN PATENT DOCUMENTS 3028301  2/1981  Fed. Rep. of Germany ...... 350/459

Primary Examiner—John K. Corbin
Assistant Examiner—Scott J. Sugarman
Attorney, Agent, or Firm—Lyon & Lyon

[57] ABSTRACT

A retro-focus type wide-angle lens having an aperture ratio of 1:2, an angle of view of about ±42°, and a back focus about 1.5 times the focal length comprises only nine component lenses. The first lens disposed nearest to the object side is a positive meniscus. The second and third lenses are each a negative meniscus. The fourth lens is a positive lens. One of the fifth and sixth lens is a double-convex lens, the other being a positive meniscus. The seventh, eighth, and ninth lenses are a double-concave lens, a positive meniscus, and a double-convex lens, respectively. The sixth and seventh lenses are cemented together. The wide-angle lens satisfies the following conditions:

(1) $1.0f < |f_{1,2,3}| < 1.3f$; $f_{1,2,3} < 0$
(2) $1.1f < r_6/(n_3 - 1) < 1.5f$
(3) $0.4f < d_6 + d_7 < 0.7f$
(4) $(n_4 + n_5)/2 > 1.65$
(5) $n_6 < n_7$
(6) $0.6f < |r_{12}| < 0.9f$; $r_{12} < 0$ where f is the focal length of the whole system, $f_{1,2,3}$ is the composite focal length from the first lens to the third lens, $n_i$ is the refractive index of the i-th lens with respect to d lines, $r_i$ is the radius of curvature of the i-th surface, and $d_i$ is the distance between the i-th surface and the (i+1)-th surface.

6 Claims, 10 Drawing Figures

WIDE-ANGLE LENS

FIELD OF THE INVENTION

The present invention relates to a retro-focus type wide-angle lens having an aperture ratio of 1:2, an angle of view of approximately ±42°, and a back focus approximately 1.5 times the focal length.

BACKGROUND OF THE INVENTION

Heretofore, it has been difficult to correct retro-focus type wide-angle lenses having large apertures, especially for their coma and spherical aberration and, accordingly, almost all the lenses of this kind are made up of ten or more component lenses. Further, the coma appearing in the vicinity of the center of the field cannot yet be satisfactorily corrected.

SUMMARY OF THE INVENTION

It is an object of the present invention to provide an improved wide-angle lens.

It is another object of the present invention to provide a wide-angle lens which is made up of a small number (that is 9) of lens elements and whose aberrations, typified by coma, have been satisfactorily corrected.

DETAILED DESCRIPTION OF THE INVENTION

Figure 1:
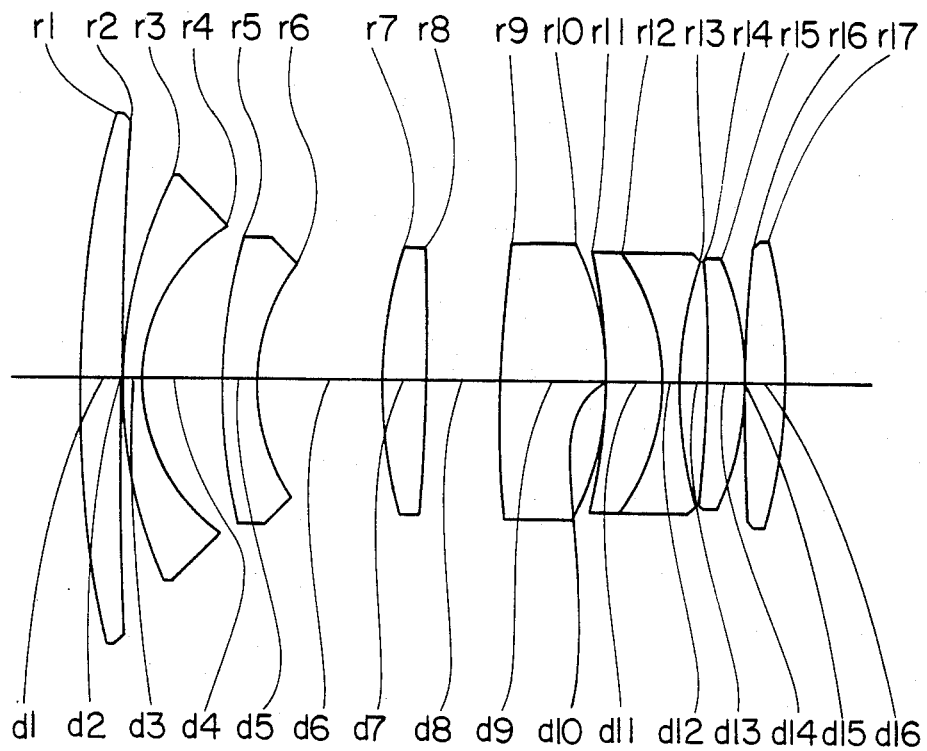
FIG. 1 is a view showing the arrangement of lens elements in Example 1 according to the present invention.
Figure 2:
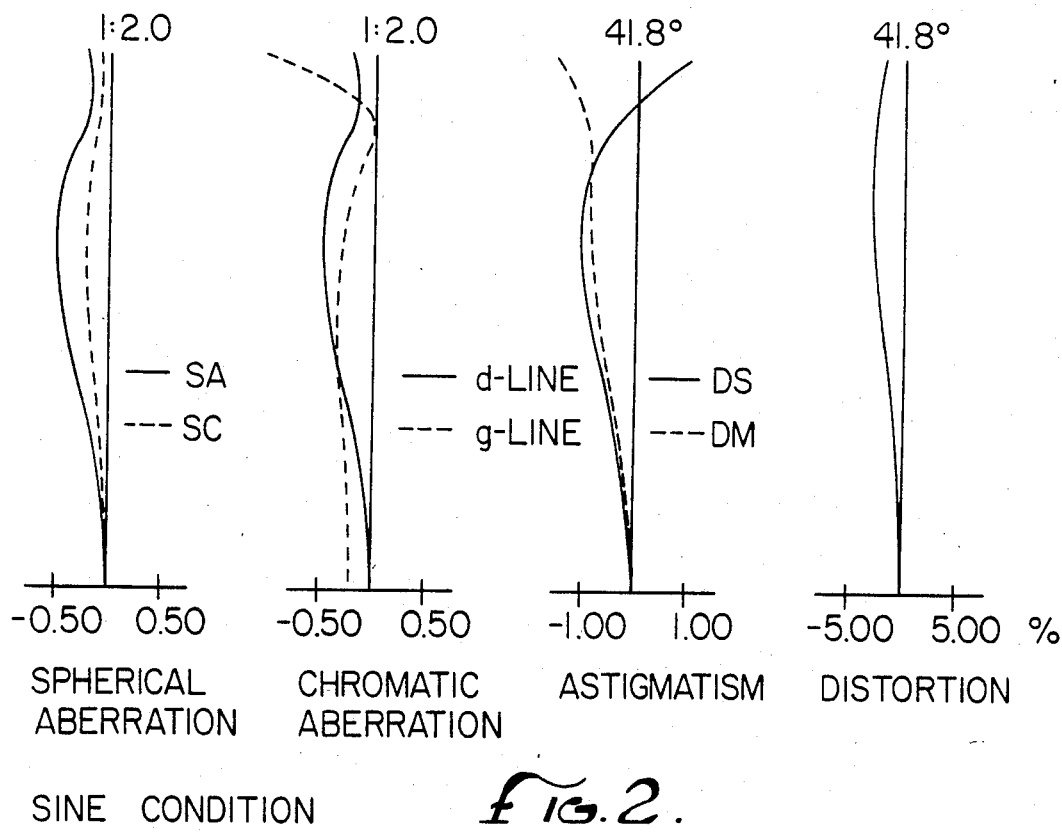
FIG. 2 is a set of graphs of aberrations in the lens of Example 1.
Figure 3:
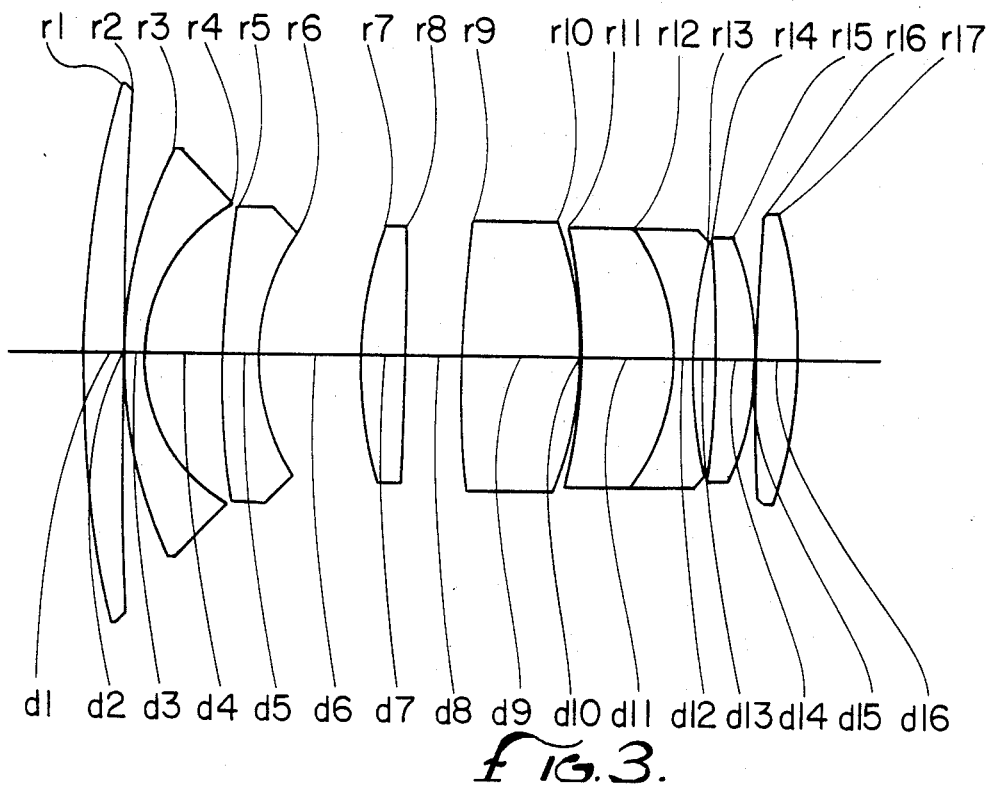
FIG. 3 is a view showing the arrangement of lens elements in Example 2.
Figure 4:
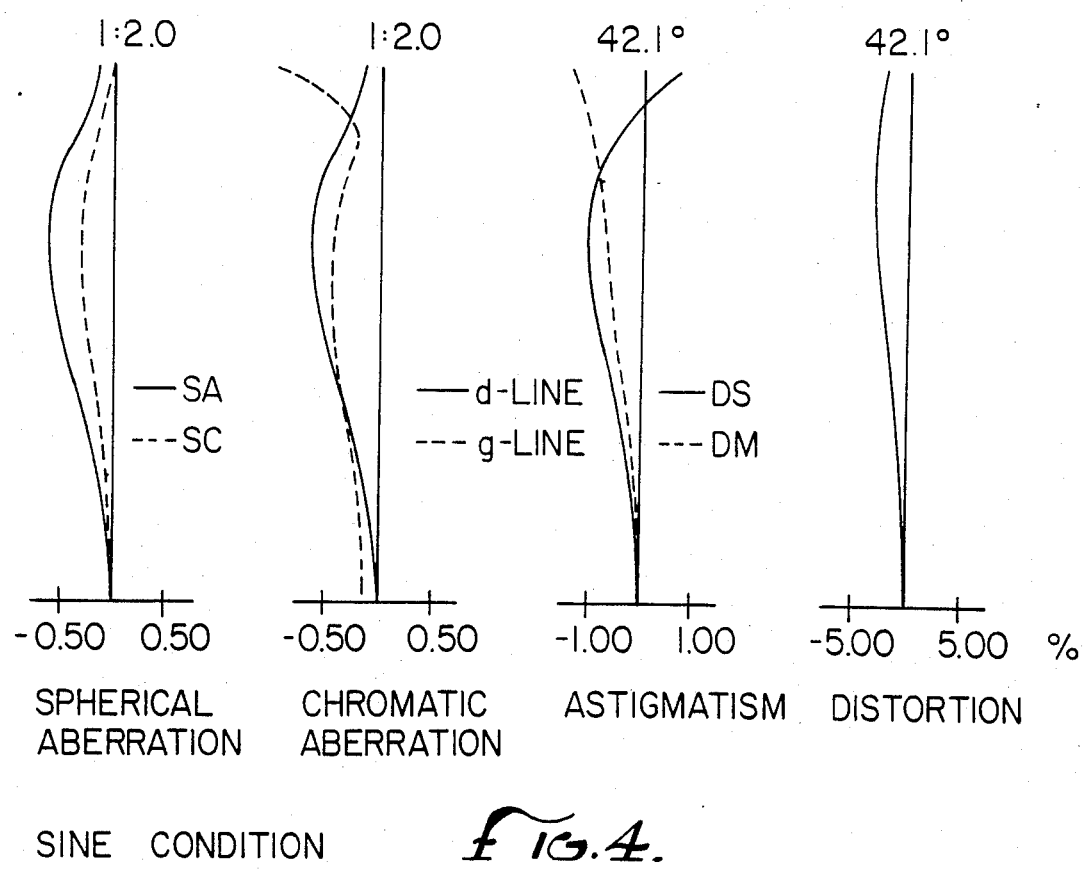
FIG. 4 is a set of graphs of aberrations in the lens of Example 2.
Figure 5:
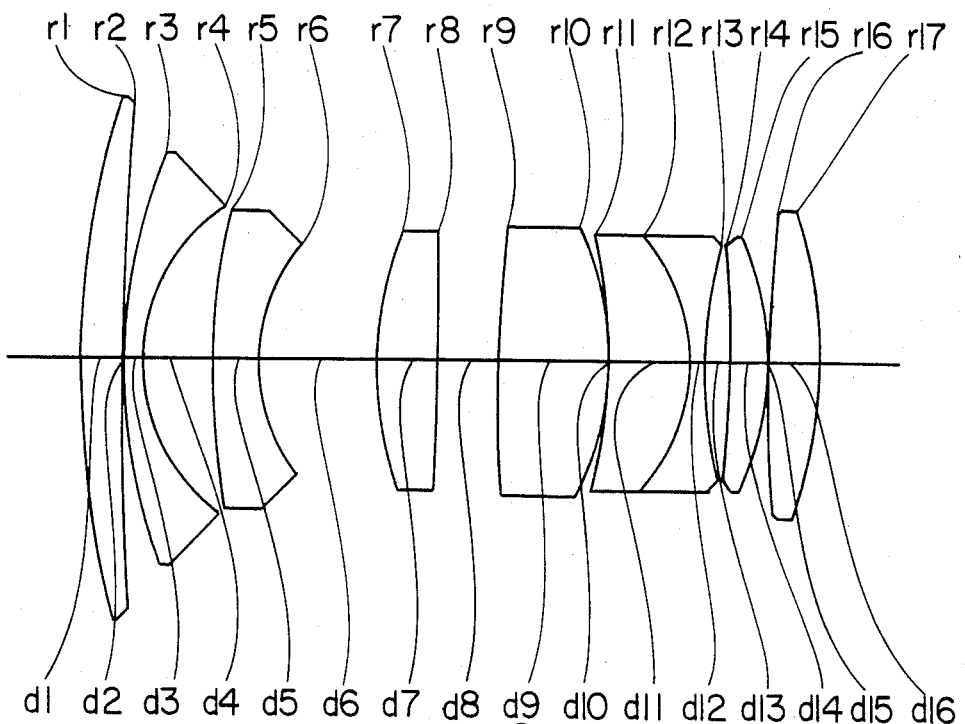
FIG. 5 is a view showing the arrangement of lens elements in Example 3.
Figure 6:
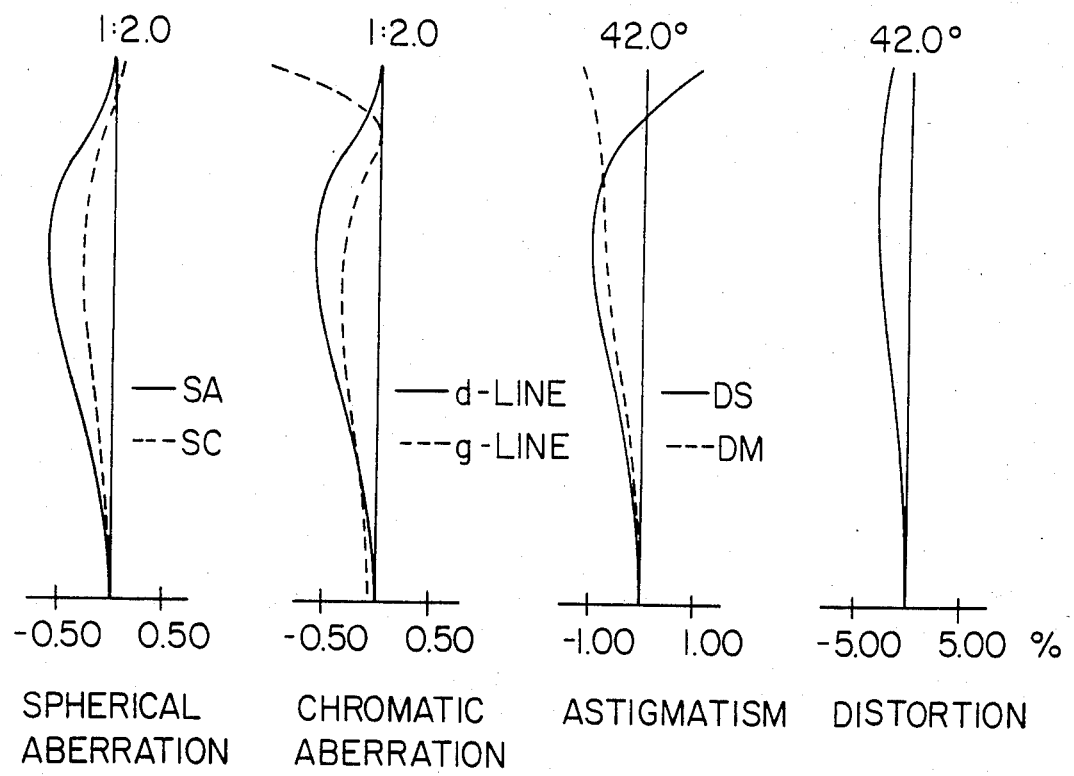
FIG. 6 is a set of graphs of aberrations in the lens of Example 3.
Figure 7:
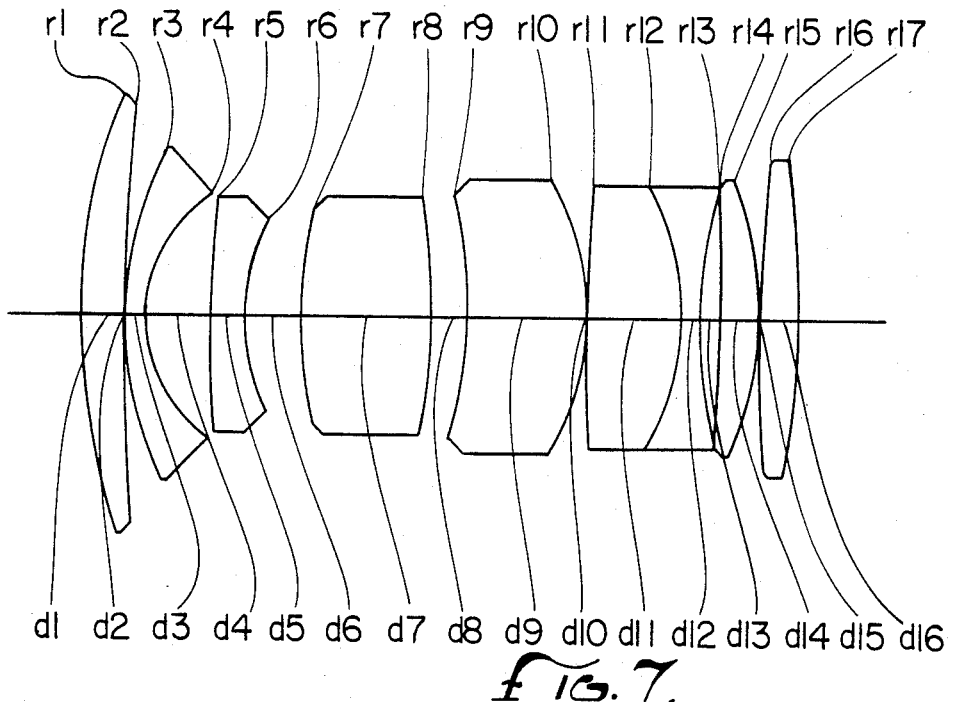
FIG. 7 is a view showing the arrangement of lens elements in Example 4.
Figure 8:
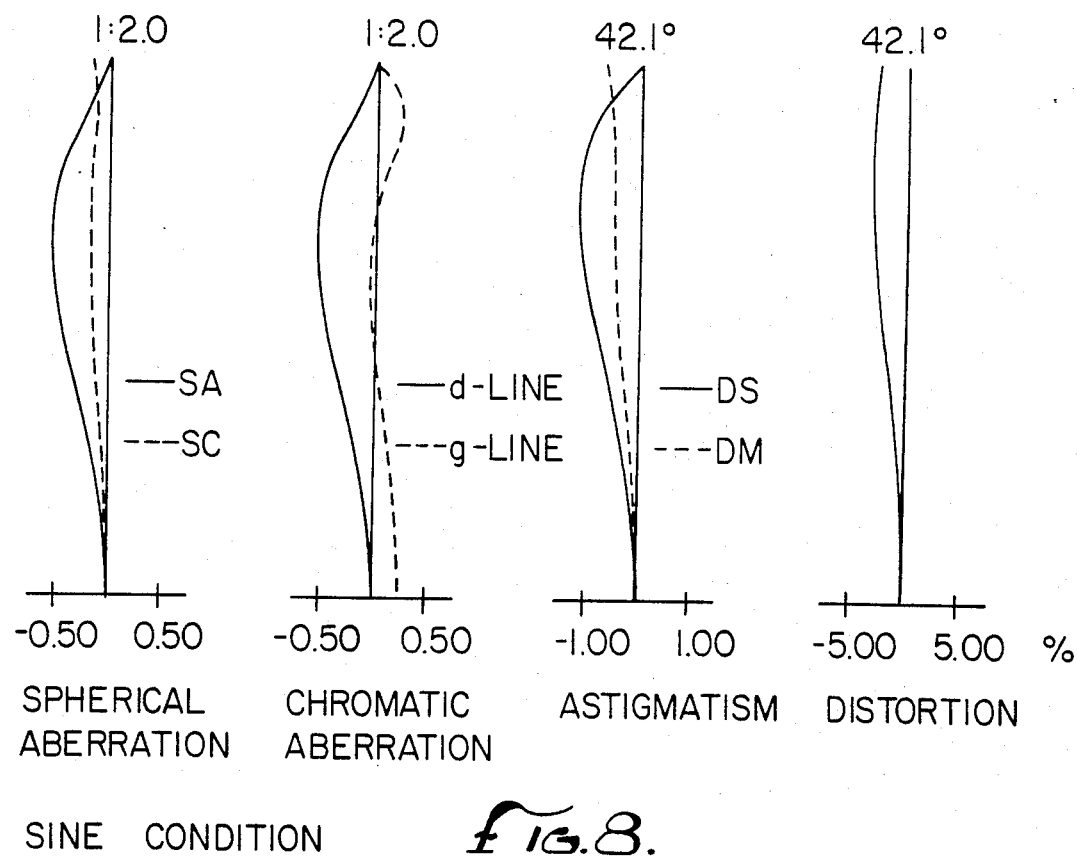
FIG. 8 is a set of graphs of aberrations in the lens of Example 4.
Figure 9:
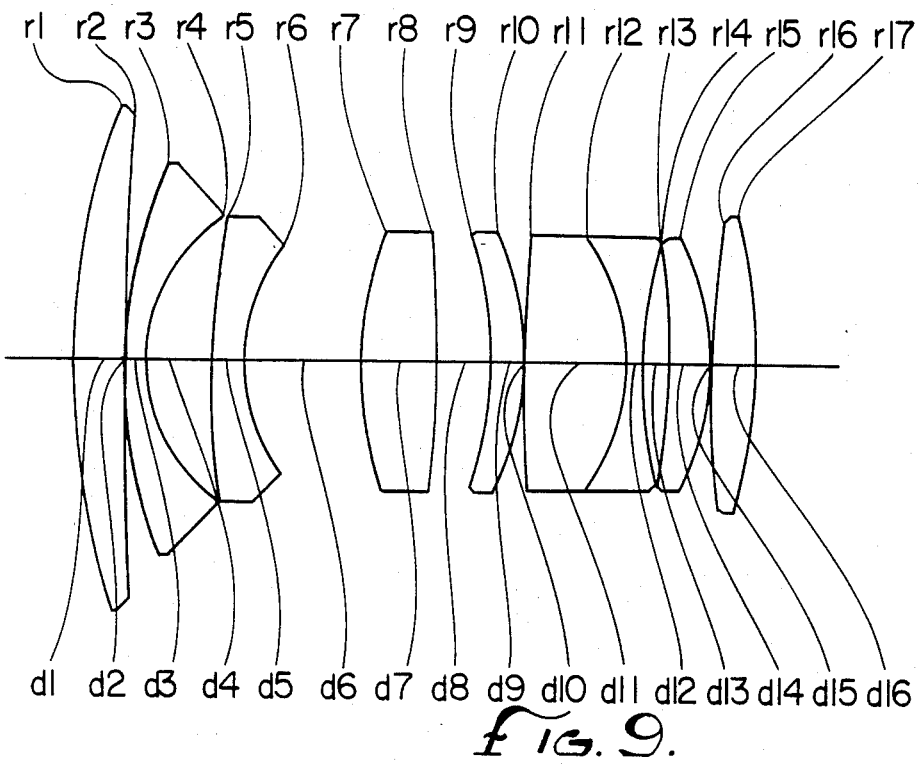
FIG. 9 is a view showing the arrangement of lens elements in Example 5.
Figure 10:
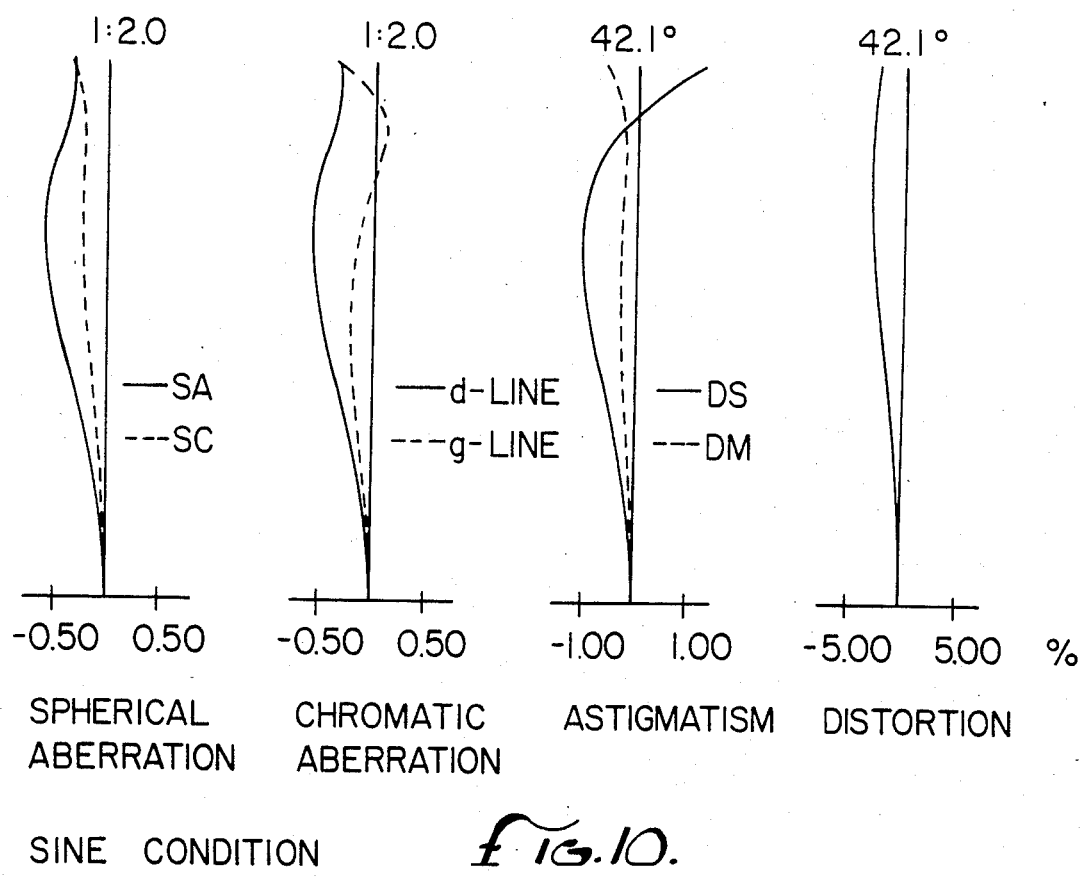
FIG. 10 is a set of graphs of aberrations in the lens of Example 5.

A retro-focus type wide-angle lens according to the teachings of the present invention comprises nine component lenses which are numbered from 1 to 9 when viewed from the object side toward the image side and which satisfy the following conditions:

(1) $1.0f < |f_{1,2,3}| < 1.3f$; $f_{1,2,3} < 0$
(2) $1.1f < r_6/(n_3-1) < 1.5f$
(3) $0.4f < d_6 + d_7 < 0.7f$
(4) $(n_4 + n_5)/2 > 1.65$
(5) $n_6 < n_7$
(6) $0.6f < |r_{12}| < 0.9f$; $r_{12} < 0$ where f is the focal length of the whole system, $f_{1,2,3}$ is the composite focal length from the first lens to the third lens, $n_i$ is the refractive index of the i-th lens with respect to d lines, $r_i$ is the radius of curvature of the i-th surface, and $d_i$ is the distance between the i-th lens and the (i+1)-th lens. The first lens is a positive meniscus whose convex surface faces the object side. The second and third lenses are negative menisci whose convex surfacs face the object side. The fourth lens is a positive lens whose surface of a smaller radius of curvature faces the object side. One of the fifth and sixth lenses is a double-convex lens whose surface of a smaller radius of curvature faces the image side, and the other is a positive meniscus whose surface of a smaller radius of curvature faces the image side. The seventh lens is a double-concave lens. The eighth lens is a positive meniscus whose surface of a smaller radius of curvature faces the image side. The ninth lens is a double-convex lens whose surface of a smaller radius of curvature faces the image side. The sixth and seventh lenses are cemented together, so that the wide-angle lense comprises eight sets of elements.

In a retro-focus type lens, lenses of negative refracting powers are disposed at the front side to have a longer back focus. If the absolute values of the negative refractive powers of the front lenses are increased, the back focus can be increased. On the other hand, the lenses at the back side are required to have positive refractive powers whose absolute values are greater than those of the lenses at the front side, for performing the imaging function. Therefore, as long as aberrations are concerned, it is desired that the absolute values of the negative refractive powers of the lenses at the front side be made as small as possible.

Conditions (1) and (2) above are set from the aforementioned reason to reduce the aberrations occurring at the front lenses, i.e., the first through third lenses. If $|f_{1,2,3}|$ is less than the lower limit of condition (1), then it will be difficult to obtain a desired back focus. Inversely, if it exceeds the upper limit of condition (1), then the aberrations at the lenses at the front side will become large. Especially, the spherical aberration at the surface ($r_6$) on the image side of the third lens which has a large negative refracting power will become large, thus causing an overcorrection. Condition (2) is established to reduce the aberration by increasing the radius of curvature of this surface ($r_6$). In particular, if $r_6/(n_3-1)$ is less than the lower limit of condition (2), then the spherical aberrations at the lenses at the front side will increase. Inversely, if it is in excess of the upper limit of the condition (2), then it will be difficult to obtain a desired back focus. Wide-angle lenses are essentially so designed that lenses are symmetrically disposed with respect to the diaphragm to correct aberrations. Hence, in a symmetrically arranged lens configuration, the coma and the distortion cancel out before and after the diaphragm, thereby presenting no major problems. Thus, other aberrations are each preferably corrected before and after the diaphragm. Particularly in a high-speed lens as in the invention, the performance of the lens is materially affected by its spherical aberration. Consequently, in the invention, the spherical aberration on the surface ($r_6$) of the third lens on the image side is suppressed by condition (2) as described above. At the same time, the surface ($r_7$) of the fourth lens which has a smaller radius of curvature and is adjacent to that surface ($r_6$) is caused to face the image side, so that almost all the spherical aberration due to the surface of the third lens which lies on the image side is canceled out.

Condition (3) is necessary to obtain a desired back focus under condition (1). If $d_6 + d_7$ is less than the lower limit of condition (3), then the axial ray will enter the lenses at the back side before a sufficiently large height of incidence is attained by the rays, in spite of the negative refracting powers of the front lenses, whereby a desired back focus does not result. If the aforementioned sum is in excess of the upper limit of condition (3), then the effective diameters of the front lenses and the total length becomes undesirably large.

Condition (4) is established to hold down increase in the Petzval sum. In a retro-focus type lens, the lenses at the back side are required to have large positive refracting powers. For this reason, there is a tendency that the Petzval sum has a large positive value and that the curvature of field becomes conspicuous. As already observed above, the spherical aberrations at the front lenses have been subjected to an overcorrection. The spherical aberration undergoes an undercorrection at the fourth lens. When a glass exhibiting a low refractive index is used, undesirable phenomena such as occurrence of spherical aberration of higher orders and an increase in the coma take place. Similar considerations apply to the fifth lens which is essentially so designed that it is disposed symmetrically with respect to the diaphragm, thus requiring the condition (4).

As can be understood from the description thus far set forth, the fifth lens corrects mainly the coma at the fourth lens which is a symmetrical aberration. The spherical aberration which was once corrected slightly insufficiently is brought into the condition of a larger undercorrection by the fifth lens. The spherical aberration is then subjected to an overcorrection again by the cemented lens following the fifth lens. This is distributed over the entire surface of the cemented lens by conditions (5) and (6), thus achieving the amendment of the spherical aberration.

If $|r_{12}|$ is below the lower limit of condition (6), then the spherical aberration at the cemented surface will be large, leading to an overcorrection of the spherical aberration. If the upper limit of condition (6) is exceeded by it, the refractive indices of the fourth and fifth lenses must be made large. This is desirable for the amendment of aberrations, because the aberration coefficients on various surfaces become small, but it renders the wide-angle lens more expensive.

EXAMPLE 1 f=100, aperture ratio=1:2.0, angle of view=±41.8°

|    | $r_i$     | $d_i$  | $n_i$   | $\nu_i$ |
|----|-----------|--------|---------|---------|
| 1  | 365.180   | 13.766 | 1.60311 | 60.7    |
| 2  | 2690.575  | 0.814  |         |         |
| 3  | 159.523   | 6.509  | 1.62004 | 36.3    |
| 4  | 58.779    | 26.263 |         |         |
| 5  | 229.911   | 11.187 | 1.48749 | 70.1    |
| 6  | 64.315    | 41.449 |         |         |
| 7  | 148.645   | 14.238 | 1.80518 | 25.4    |
| 8  | −974.563  | 24.253 |         |         |
| 9  | 467.820   | 33.622 | 1.80610 | 40.9    |
| 10 | −119.192  | 0.814  |         |         |
| 11 | −214.961  | 20.108 | 1.48749 | 70.1    |
| 12 | −69.319   | 6.102  | 1.80518 | 25.4    |
| 13 | 156.862   | 8.010  |         |         |
| 14 | −585.792  | 12.436 | 1.69100 | 54.8    |
| 15 | −105.443  | 0.814  |         |         |
| 16 | 820.670   | 13.018 | 1.69100 | 54.8    |
| 17 | −182.905  |        |         |         | where $r_i$ is the radius of curvature of the i-th surface, $d_i$ is the distance between the i-th surface and the (i+1)-th surface, $n_i$ is the refractive index of the i-th lens with respect to d lines, and $\nu_i$ is the Abbe number of the i-th lens with respect to d lines.

back focus=1.51f
$|f_{1,2,3}|=1.1f$
$r_6/(n_3-1)=1.32f$
$d_6+d_7=0.56f$
$|r_{12}|=0.69f$
position of diaphragm=14.2 from the 8-th surface

EXAMPLE 2 f=100, aperture ratio=1:2.0, angle of view=±42.1°

|    | $r_i$     | $d_i$  | $n_i$   | $\nu_i$ |
|----|-----------|--------|---------|---------|
| 1  | 345.741   | 13.165 | 1.60311 | 60.7    |
| 2  | 1817.143  | 0.816  |         |         |
| 3  | 144.478   | 6.531  | 1.64769 | 33.8    |
| 4  | 57.009    | 26.353 |         |         |
| 5  | 323.662   | 11.226 | 1.48749 | 70.1    |
| 6  | 67.288    | 34.175 |         |         |
| 7  | 144.572   | 14.287 | 1.80518 | 25.4    |
| 8  | −2624.306 | 18.524 |         |         |
| 9  | 393.758   | 38.906 | 1.80610 | 40.9    |
| 10 | −119.088  | 0.816  |         |         |
| 11 | −201.635  | 31.350 | 1.48749 | 70.1    |
| 12 | −66.128   | 6.123  | 1.80518 | 25.4    |
| 13 | 174.399   | 8.021  |         |         |
| 14 | −343.982  | 12.413 | 1.69100 | 54.8    |
| 15 | −100.274  | 0.816  |         |         |
| 16 | 711.868   | 13.879 | 1.69100 | 54.8    |
| 17 | −152.136  |        |         |         | back focus=1.49f
$|f_{1,2,3}|=1.16f$
$r_6/(n_3-1)=1.38f$
$d_6+d_7=0.48f$
$|r_{12}|=0.66f$
position of diaphragm=12.2 from the 8-th surface

EXAMPLE 3 f=100, aperture ratio=1:2.0, angle of view=±42.1°

|    | $r_i$     | $d_i$  | $n_i$   | $\nu_i$ |
|----|-----------|--------|---------|---------|
| 1  | 301.607   | 13.760 | 1.69100 | 54.8    |
| 2  | 1212.076  | 0.816  |         |         |
| 3  | 182.180   | 6.531  | 1.64769 | 33.8    |
| 4  | 61.267    | 23.251 |         |         |
| 5  | 227.384   | 15.528 | 1.49700 | 81.6    |
| 6  | 63.042    | 38.787 |         |         |
| 7  | 142.748   | 18.965 | 1.80518 | 25.4    |
| 8  | −2384.811 | 19.524 |         |         |
| 9  | 442.244   | 35.571 | 1.80610 | 40.9    |
| 10 | −116.353  | 0.816  |         |         |
| 11 | −199.132  | 26.982 | 1.48749 | 70.1    |
| 12 | −64.941   | 6.123  | 1.80518 | 25.4    |
| 13 | 175.424   | 8.046  |         |         |
| 14 | −370.617  | 12.193 | 1.69100 | 54.8    |
| 15 | −99.491   |        |         |         |
| 16 | 653.557   | 15.785 | 1.69100 | 54.8    |
| 17 | −171.020  |        |         |         | back focus=1.49f
$|f_{1,2,3}|=1.13f$
$r_6/(n_3-1)=1.27f$
$d_6+d_7=0.58f$
$|r_{12}|=0.65f$
position of diaphragm=12.2 from the 8-th surface

EXAMPLE 4 f=100, aperture ratio=1:2.0, angle of view=±42.1°

|    | $r_i$       | $d_i$  | $n_i$   | $v_i$ |
|----|-------------|--------|---------|-------|
| 1  | 213.988     | 13.866 | 1.58913 | 61.0  |
| 2  | 757.984     | 0.407  |         |       |
| 3  | 115.437     | 6.514  | 1.69895 | 30.1  |
| 4  | 47.643      | 21.658 |         |       |
| 5  | 414.827     | 11.195 | 1.48749 | 70.1  |
| 6  | 68.735      | 18.197 |         |       |
| 7  | 145.876     | 42.746 | 1.80518 | 25.4  |
| 8  | −260.739    | 12.091 |         |       |
| 9  | −149.613    | 38.675 | 1.74950 | 35.3  |
| 10 | −93.185     | 0.814  |         |       |
| 11 | 676.625     | 31.795 | 1.62041 | 60.3  |
| 12 | −79.535     | 6.107  | 1.80518 | 25.4  |
| 13 | 180.516     | 5.822  |         |       |
| 14 | −33892.296  | 13.434 | 1.69100 | 54.8  |
| 15 | −114.652    | 0.814  |         |       |
| 16 | 762.030     | 12.213 | 1.69100 | 54.8  |
| 17 | −370.144    |        |         |       | back focus=1.49f
$|f_{1,2,3}|$ =1.26f
$r_6/(n_3-1)$=1.41f
$d_6+d_7$=0.61f
$|r_{12}|$ =0.79f
position of diaphragm=1.2 from the 8-th surface

EXAMPLE 5 f=100, aperture ratio=1:2.0, angle of view=±42.0°

|    | $r_i$     | $d_i$  | $n_i$   | $v_i$ |
|----|-----------|--------|---------|-------|
| 1  | 240.942   | 17.176 | 1.48749 | 70.1  |
| 2  | 1588.299  | 0.407  |         |       |
| 3  | 159.816   | 6.517  | 1.64769 | 33.8  |
| 4  | 57.344    | 21.668 |         |       |
| 5  | 263.030   | 11.201 | 1.48749 | 70.1  |
| 6  | 63.681    | 37.920 |         |       |
| 7  | 121.978   | 24.784 | 1.80518 | 25.4  |
| 8  | −440.173  | 17.208 |         |       |
| 9  | −140.681  | 10.789 | 1.74950 | 35.3  |
| 10 | −108.053  | 0.815  |         |       |
| 11 | 648.752   | 34.213 | 1.49700 | 81.6  |
| 12 | −67.909   | 6.110  | 1.80518 | 25.4  |
| 13 | 187.680   | 7.596  |         |       |
| 14 | −311.316  | 14.256 | 1.69100 | 54.8  |
| 15 | −87.207   | 0.815  |         |       |
| 16 | 437.526   | 14.256 | 1.69100 | 54.8  |
| 17 | −189.904  |        |         |       | back focus=1.54f
$|f_{1,2,3}|$ =1.14f
$r_6/(n_3-1)$=1.31f
$d_6+d_7$=0.63f
$|r_{12}|$ =0.68f
position of diaphragm=2.0 from the 8-th surface

What is claimed is:

1. A retro-focus type wide-angle lens comprising nine component lenses which are numbered consecutively from one to nine when viewed from the object side and which satisfy the conditions below, the first lens being a positive meniscus whose convex surface faces the object side, the second and third lenses being negative menisci whose convex surfaces face the object side, the fourth lens being a positive lens whose surface of a smaller radius of curvature faces the object side, one of the fifth and sixth lenses being a double-convex lens whose surface of a smaller radius of curvature faces the image side, the other being a positive meniscus whose surface of a smaller radius of curvature faces the image side, the seventh lens being a double-concave lens, the sixth and seventh lenses being cemented together, the eighth lens being a positive meniscus whose surface of a smaller radius of curvature faces the image side, the ninth lens being a double-convex lens whose surface of a smaller radius of curvature faces the image side, whereby the wide-angle lens comprises eight sets of elements and satisfies the following conditions, (1) $1.0f<|f_{1,2,3}|<1.3f$, $f_{1,2,3}<0$
(2) $1.1f<r_6/(n_3-1)<1.5f$
(3) $0.4f<d_6+d_7<0.7f$
(4) $(n_4+n_5)/2>1.65$
(5) $n_6<n_7$
(6) $0.6f<|r_{12}|<0.9f$, $r_{12}<0$ where f is the focal length of the whole system, $f_{1,2,3}$ is the composite focal length from the first lens to the third lens, $n_i$ is the refractive index of the i-th lens with respect to d lines, $r_i$ is the radius of curvature of the i-th surface, and $d_i$ is the distance between the i-th surface and the (i+1)-th surface.

2. A wide-angle lens as in claim 1 having the following numerical data:

f=100, aperture ratio=1:2.0, angle of view±41.8°

|    | $r_i$     | $d_i$  | $n_i$   | $v_i$ |
|----|-----------|--------|---------|-------|
| 1  | 365.180   | 13.766 | 1.60311 | 60.7  |
| 2  | 2690.575  | 0.814  |         |       |
| 3  | 159.523   | 6.509  | 1.62004 | 36.3  |
| 4  | 58.779    | 26.263 |         |       |
| 5  | 229.911   | 11.187 | 1.48749 | 70.1  |
| 6  | 64.315    | 41.449 |         |       |
| 7  | 148.645   | 14.238 | 1.80518 | 25.4  |
| 8  | −974.563  | 24.253 |         |       |
| 9  | 467.820   | 33.622 | 1.80610 | 40.9  |
| 10 | −119.192  | 0.814  |         |       |
| 11 | −214.961  | 20.108 | 1.48749 | 70.1  |
| 12 | −69.319   | 6.102  | 1.80518 | 25.4  |
| 13 | 156.862   | 8.010  |         |       |
| 14 | −585.792  | 12.436 | 1.69100 | 54.8  |
| 15 | −105.443  | 0.814  |         |       |
| 16 | 820.670   | 13.018 | 1.69100 | 54.8  |
| 17 | −182.905  |        |         |       | where $r_i$ is the radius of the curvature of the i-th surface, $d_i$ is the distance between the i-th surface and the (i+1)-th surface, $n_i$ is the refractive index of the i-th lens with respect to α lines, and $v_i$ is the Abbe number of the i-th lens with respect to α lines back focus=1.51f
$|f_{1,2,3}|$ =1.1f
$r_6/(n_3-1)$=1.32f
$d_6+d_7$=0.56f
$|r_{12}|$ =0.69f
position of diaphragm=14.2 from the 8-th surface.

3. A wide-angle lens as in claim 1 having the following numerical data:

f=100, aperture ratio=1:2.0, angle of view=±42.1°

|   | $r_i$    | $d_i$  | $n_i$   | $v_i$ |
|---|----------|--------|---------|-------|
| 1 | 345.741  | 13.165 | 1.60311 | 60.7  |
| 2 | 1817.143 | 0.816  |         |       |

-continued

| | $r_i$ | $d_i$ | $n_i$ | $\nu_i$ |
|---|---|---|---|---|
| 3 | 144.478 | 6.531 | 1.64769 | 33.8 |
| 4 | 57.009 | 26.353 | | |
| 5 | 323.662 | 11.226 | 1.48749 | 70.1 |
| 6 | 67.280 | 34.175 | | |
| 7 | 144.572 | 14.287 | 1.80518 | 25.4 |
| 8 | −2624.306 | 18.524 | | |
| 9 | 393.758 | 38.906 | 1.80610 | 40.9 |
| 10 | −119.008 | 0.816 | | |
| 11 | −201.635 | 31.350 | 1.48749 | 70.1 |
| 12 | −66.128 | 6.123 | 1.80518 | 25.4 |
| 13 | 174.399 | 8.021 | | |
| 14 | −343.982 | 12.413 | 1.69100 | 54.8 |
| 15 | −100.274 | 0.816 | | |
| 16 | 711.868 | 13.879 | 1.69100 | 54.8 |
| 17 | −152.136 | | | | back focus=1.49f
$|f_{1,2,3}|=1.16f$
$r_6/(n_3-1)=1.38f$
$d_6+d_7=0.48f$
$|r_{12}|=0.66f$
position of diaphragm=12.1 from the 8-th surface.

4. A wide-angle lens as in claim 1 having the following numerical data:
f=100, aperture ratio=1:2.0, angle of view=±42.1°

| | $r_i$ | $d_i$ | $n_i$ | $\nu_i$ |
|---|---|---|---|---|
| 1 | 301.607 | 13.760 | 1.69100 | 54.8 |
| 2 | 1212.076 | 0.816 | | |
| 3 | 182.180 | 6.531 | 1.64769 | 33.8 |
| 4 | 61.267 | 23.251 | | |
| 5 | 227.384 | 15.528 | 1.47900 | 81.6 |
| 6 | 63.042 | 38.787 | | |
| 7 | 142.748 | 18.965 | 1.80518 | 25.4 |
| 8 | −2384.811 | 19.524 | | |
| 9 | 442.244 | 35.571 | 1.80610 | 40.9 |
| 10 | −116.353 | 0.816 | | |
| 11 | −199.132 | 26.982 | 1.48749 | 70.1 |
| 12 | −64.941 | 6.123 | 1.80518 | 25.4 |
| 13 | 175.424 | 8.046 | | |
| 14 | −370.617 | 12.193 | 1.69100 | 54.8 |
| 15 | −99.491 | | | |
| 16 | 653.557 | 15.785 | 1.69100 | 54.8 |
| 17 | −171.020 | | | | back focus 1.49f
$|f_{1,2,3}|=1.13f$
$r_6/(n_3-1)=1.27f$
$d_6+d_7=0.58f$
$|r_{12}|=0.65f$
position of diaphragm=12.2 from the 8-th surface.

5. A wide angle lens as in claim 1 having the following numerical data:
f=100, aperture ratio=1:2.0, angle of view=±42.1°

| | $r_i$ | $d_i$ | $n_i$ | $\nu_i$ |
|---|---|---|---|---|
| 1 | 213.988 | 13.866 | 1.58913 | 61.0 |
| 2 | 757.984 | 0.407 | | |
| 3 | 115.437 | 6.514 | 1.69895 | 30.1 |
| 4 | 47.643 | 21.658 | | |
| 5 | 414.827 | 11.195 | 1.48749 | 70.1 |
| 6 | 68.735 | 18.197 | | |
| 7 | 145.876 | 42.746 | 1.80518 | 25.4 |
| 8 | −260.739 | 12.091 | | |
| 9 | −149.613 | 38.675 | 1.74950 | 35.3 |
| 10 | −93.185 | 0.814 | | |
| 11 | 676.625 | 31.795 | 1.62041 | 60.3 |
| 12 | −79.535 | 6.107 | 1.80518 | 25.4 |
| 13 | 180.516 | 5.822 | | |
| 14 | −33892.296 | 13.434 | 1.69100 | 54.8 |
| 15 | −114.652 | 0.814 | | |
| 16 | 762.030 | 12.213 | 1.69100 | 54.8 |
| 17 | −370.144 | | | | back focus 1.49f
$|f_{1,2,3}|=1.26f$
$r_6/(n_3-1)=1.41f$
$d_6+d_7=0.61f$
$|r_{12}|=0.79f$
position of diaphragm=1.2 from the 8-th surface.

6. A wide-angle lens as in claim 1 having the following numerical data:
f=100, aperture ratio=1:2.0, angle of view=±42.0°

| | $r_i$ | $d_i$ | $n_i$ | $\nu_i$ |
|---|---|---|---|---|
| 1 | 240.942 | 17.176 | 1.48749 | 70.1 |
| 2 | 1588.299 | 0.407 | | |
| 3 | 159.816 | 6.517 | 1.64769 | 33.8 |
| 4 | 57.344 | 21.668 | | |
| 5 | 263.030 | 11.201 | 1.48749 | 70.1 |
| 6 | 63.681 | 37.920 | | |
| 7 | 121.978 | 24.784 | 1.80518 | 25.4 |
| 8 | −440.173 | 17.208 | | |
| 9 | −140.681 | 10.789 | 1.74950 | 35.3 |
| 10 | −108.053 | 0.815 | | |
| 11 | 648.752 | 34.213 | 1.49700 | 81.6 |
| 12 | −67.909 | 6.110 | 1.80518 | 25.4 |
| 13 | 187.680 | 7.596 | | |
| 14 | −311.316 | 14.256 | 1.69100 | 54.8 |
| 15 | −87.207 | 0.815 | | |
| 16 | 437.526 | 14.256 | 1.69100 | 54.8 |
| 17 | −189.904 | | | | back focus 1.54f
$|f_{1,2,3}|=1.14f$
$r_6/(n_3-1)=1.31f$
$d_6+d_7=0.63f$
$|r_{12}|=0.68f$
position of diaphragm=2.0 from the 8-th surface.

* * * * *